(12) United States Patent
Chapin (10) Patent No.: US 9,055,028 B1
(45) Date of Patent: *Jun. 9, 2015

(54) FLEXIBLY TARGETING INFORMATION SENT OVER A BROADCAST COMMUNICATIONS MEDIUM

(71) Applicant: TV Band Service, LLC, Wilmington, NC (US)

(72) Inventor: John M. Chapin, Alexandria, VA (US)

(73) Assignee: TV BAND SERVICE, LLC, Wilmington, NC (US)

( * ) Notice: Subject to any disclaimer, the term of this patent is extended or adjusted under 35 U.S.C. 154(b) by 90 days.

This patent is subject to a terminal disclaimer.

(21) Appl. No.: 13/927,856

(22) Filed: Jun. 26, 2013

Related U.S. Application Data

(63) Continuation of application No. 13/019,627, filed on Feb. 2, 2011, now Pat. No. 8,503,925.

(51) Int. Cl.
*H04H 40/90* (2008.01)
*H04L 29/08* (2006.01)

(52) U.S. Cl.
CPC ..................... *H04L 67/02* (2013.01)

(58) Field of Classification Search
CPC ............. H04L 12/1859; H04L 12/585; H04L 12/5855; H04L 51/14; H04L 67/26; H04L 67/327; H04M 2203/205; H04M 2242/04; H04M 3/42382
USPC ................ 455/3.01, 415, 3.04, 435.2, 435.3, 455/456.2, 512, 67.11; 375/259, 316; 709/217, 218, 219; 707/769
See application file for complete search history.

(56) References Cited

U.S. PATENT DOCUMENTS

| | | | |
|---|---|---|---|
| 6,256,509 B1 * | 7/2001 | Tanaka et al. | 455/515 |
| 6,807,564 B1 | 10/2004 | Zellner et al. | |
| 6,847,395 B2 | 1/2005 | Thomas et al. | |
| 6,871,236 B2 | 3/2005 | Fishman et al. | |
| 6,950,124 B2 | 9/2005 | Corl et al. | |
| 7,215,360 B2 | 5/2007 | Gupta | |
| 7,263,666 B2 | 8/2007 | Corl et al. | |
| 7,305,696 B2 | 12/2007 | Thomas et al. | |
| 7,472,422 B1 * | 12/2008 | Agbabian | 726/25 |
| 7,519,720 B2 | 4/2009 | Fishman et al. | |
| 7,565,506 B2 | 7/2009 | Chen et al. | |
| 7,617,287 B2 | 11/2009 | Vella et al. | |
| 7,783,316 B1 | 8/2010 | Mitchell | |

(Continued)

OTHER PUBLICATIONS

Groticelli, M.; "The challenges of datacasting"; BroadcastEngineering; Jun. 1, 2005; all pages.

(Continued)

*Primary Examiner* — Tan Trinh
(74) *Attorney, Agent, or Firm* — North Shore Patents, P.C.; Michele Liu Baillie (57) ABSTRACT

A system for flexibly targeting information sent over a broadcast communications medium includes a sender of information signals each carrying information and a targeter for use by a user having a receiver with a targeter. There are a number of the receivers constructed and arranged to receive signals from the sender through a broadcast communications medium. The targeter includes a number of selectors associated with an action ID and a number of key value pairs, constructed and arranged to indicate action to be taken by a user of a selected receiver in the condition that the selector evaluates to true given the values stored in the targeters.

16 Claims, 6 Drawing Sheets

(56) References Cited

U.S. PATENT DOCUMENTS

| | | | |
|---|---|---|---|
| 2001/0013069 A1 | 8/2001 | Shah | |
| 2002/0129354 A1 | 9/2002 | Bryan et al. | |
| 2003/0187996 A1* | 10/2003 | Cardina et al. | 709/228 |
| 2004/0153511 A1 | 8/2004 | Maynard et al. | |
| 2005/0008004 A1 | 1/2005 | Williams | |
| 2005/0086685 A1 | 4/2005 | Rahman et al. | |
| 2006/0010215 A1 | 1/2006 | Clegg et al. | |
| 2007/0004377 A1 | 1/2007 | Medford et al. | |
| 2007/0136743 A1 | 6/2007 | Hasek et al. | |
| 2007/0216572 A1 | 9/2007 | Schnabel | |
| 2008/0034114 A1 | 2/2008 | Ducey et al. | |
| 2008/0085695 A1 | 4/2008 | Vare et al. | |
| 2008/0090599 A1 | 4/2008 | Patel et al. | |
| 2008/0132254 A1* | 6/2008 | Graham et al. | 455/466 |
| 2008/0195664 A1 | 8/2008 | Maharajh et al. | |
| 2012/0070090 A1* | 3/2012 | Chang et al. | 382/218 |
| 2013/0308652 A1* | 11/2013 | Rich et al. | 370/428 |
| 2014/0059453 A1* | 2/2014 | Shuster et al. | 715/757 |
| 2014/0223479 A1* | 8/2014 | Krishnamoorthi et al. | 725/39 |
| 2014/0242566 A1* | 8/2014 | Rich et al. | 434/350 |

OTHER PUBLICATIONS

Richland County GIS; "Automated Vehicle Location for Asset Management"; Columbia, South Carolina; Sep. 2007; all pages.

Advanced Television Systems Committee; "ATSC Candidate Standard: Non-Real-Time Content Delivery"; Washington D.C.; Dec. 2010; all pages.

Catapano, D. et al.; "DTV Data Broadcasting: Opportunities and Experiences"; International Association of Broadcasting Manufacturers; Jul. 2003; all pages.

Gomez-Barquero, D. et al.; "Filecasting for Streaming Content Delivery in IP Datacast over DVB-H Systems"; Broadband Multimedia Systems and Broadcasting, 2008 IEEE International Symposium; Mar. 2008; all pages.

Valcourt, S.A. et al.; "Using Two-Way Datacasting to Deliver Real-Time Public Safety Information"; Technologies for Homeland Security, 2008 IEEE Conference; May 2008; all pages.

"Project 54: Meet Your Car of the Future"; Mission Critical Communications, vol. 23, Issue 10; Oct. 2008; Abstract.

Valcourt, S.A.; et al.; "Information Integration for Public Safety Officers"; Proc. of SPIE, vol. 6943, 6943OM-1; Orlando, FL; Mar. 2008; all pages.

Skyscraper 3.0; Triveni Digital; Sep. 2005; all pages.

Thomas, G.; "ATSC Datacasting: Opportunities and challenges"; NAB Broadcasting Engineering Conference; Apr. 2000; all pages.

Nandhakumar, N. et al.; "DTV Datacasting Opportunities and Challenges"; Workshop on Video Compression & Delivery, Broadcast Engineering Society; Bangalore, India; Jun. 2002; all pages.

"Local Emergency Services Network Technology Deployed"; TV TechCheck; Apr. 2007; all pages.

Bhat, D., et al.; "An Open Interface to a DTV Data Server"; NAB 2001 Broadcast Engineering Conference; Apr. 2001; all pages.

"SkyCraper Interactive"; Triveni Digital; Mar. 2002; all pages.

Nandhakumar, N.; "Field Experience with Datacast Services"; Triveni Digital; Feb. 2002; all pages.

"City of Rochester Fire Department Selects End-to-End Triveni Digital Solution for Public Safety Communications Network in the State of New York"; Triveni Digital; Feb. 2006; all pages.

"KLCS Pilots Data Broadcasting of Educational Materials with Triveni Digital"; Triveni Digital; Apr. 2004; all pages.

"Mississippi Public Broadcasting and Triveni Digital Respond to Havoc Created on Education System by Hurricane Katrina"; Triveni Digital; Nov. 2005; all pages.

"StreamBridge CR30 Digital EAS"; Triveni Digital; Sep. 2005; all pages.

"StreamScope MT-40"; Triveni Digital; Jul. 2007; all pages.

"StreamScope RM-40"; Triveni Digital; Jul. 2007; all pages.

"Skyscraper ESN: Emergency Services Network (ESN) Solution"; Triveni Digital; Mar. 2006; all pages.

"SkyScraper 3.0"; Triveni Digital; Sep. 2005; all pages.

\* cited by examiner

FLEXIBLY TARGETING INFORMATION SENT OVER A BROADCAST COMMUNICATIONS MEDIUM

CROSS-REFERENCE TO RELATED APPLICATIONS

The present application is a continuation of co-pending U.S. patent application Ser. No. 13/019,627, filed on Feb. 2, 2011.

BACKGROUND OF THE INVENTION

The present invention relates in general to flexibly targeting information, and more particularly over a broadcast communications medium.

One approach to targeting information is unicast addressing. Each message sent contains a particular numeric address. Devices that receive the message compare the address value with an address stored in the device and only deliver the message if the two match. Another form of targeting is multicast addressing where certain ranges or types of addresses are prearranged to represent groups of devices rather than individual devices. A receiving device delivers the message if the message address matches the receiving device's specific address or that of any of the multicast groups configured into the receiving device.

Another approach involves addressing by labels rather than by numeric addresses. For example, a sender inserts a label into the message describing the type of receiver desired, such as a printer. Each receiver stores a set of labels and delivers messages that match at least one of the labels.

The above forms of targeting are forms of "push" targeting in which the sender identifies the recipient(s) of the message based on the address or label inserted into the message. Another form of targeting is "pull" targeting in which the receiving device determines which sent messages to deliver. For example, a form of pull targeting consists of inserting a text string that describes or identifies the contents of the message in the transmitted message. This text string is called a "descriptor." One form of descriptor is a stock ticker symbol, and this descriptor is inserted into any message containing news stories about the company identified by that symbol. Receiving devices store a set of descriptors and deliver messages whose descriptor match at least one of the stored descriptors.

In another form of pull targeting, the descriptor stored in a message is a structured set containing one or multiple elements that collectively describe or identify the contents of the message. Each element of the descriptor may be a string or a numeric value or other data type. Receiving devices store a set of logical formulas, each of which is evaluated against the elements of the descriptor in the message. If one or more of the formulas evaluate to true, the message is delivered.

It is an important object of the invention to provide improved targeting.

BRIEF SUMMARY OF THE INVENTION

According to the invention, a system is characterized by the benefits of both push and pull targeting to meet a wide range of user needs and provide control over the actions that occur when the device determines that a message should be delivered.

According to a feature of the invention, targeting is accomplished with a data structure called a targeter that is an expression attached to a transmitted data package or stored in a receiving device and that contains logical formulas called selectors, each paired with a short code, or action identifier, and a set of key values pairs that are descriptors.

After a device receives a message targeting occurs as follows. The device evaluates each selector in the message and each selector stored in the device. If any selector evaluates to true, the action described by the action identifier paired with that selector is carried out.

The selectors are typically compound Boolean expressions. There may be sub expressions that may be other Boolean expressions or function invocations. Functions that may be used in selectors include relational operators, such as equals or less than. Sub expressions may name keys from the descriptors in the message or the descriptors stored in the device.

Evaluating a Boolean expression of this type is a well-understood procedure described in many computer science textbooks and follows a process whose outcome is the same as if one were to: make a copy of the expression, replace each occurrence of a key with a corresponding value from the list of descriptors, identify function calls or relational expressions at the leaves of the Boolean expression tree and replace each function call or relational expression with the result of evaluating that function call or relational expression, then evaluate the resulting Boolean expression to determine a final value of true or false. If some key in the expression is not present in the descriptor list, the final value is false irrespective of the other parts of the expression.

Numerous other features, objects and advantages of the invention will become apparent from the following detailed description when read in connection with the accompanying drawing in which:

DETAILED DESCRIPTION OF THE INVENTION

Figure 1:
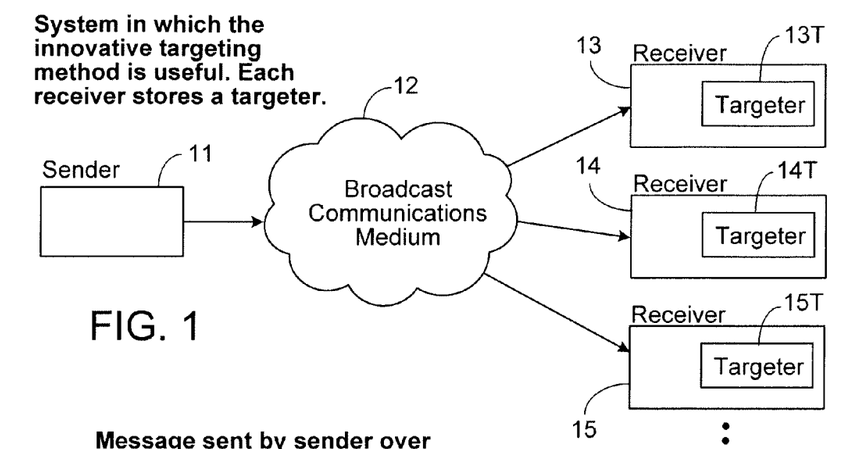
FIG. 1 is a block diagram of a system according to the invention.

With reference to the drawing and more particularly FIG. 1, there is shown a diagrammatic representation of a system embodying the invention. A sender 11 transmits information including a targeter over broadcast communications medium 12 to receivers such as 13, 14 and 15 each storing a targeter such as 13T, 14T and 1ST, respectively.

Figure 2:
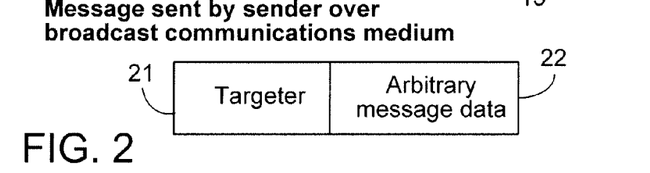
FIG. 2 is a representation of a message sent by the sender of FIG. 1 over the broadcast communications medium of FIG. 1.

Referring to FIG. 2, there is a diagrammatic representation of a typical message sent by sender 11 over broadcast communications medium 12 including targeter 21 and arbitrary message data 22.

Figure 3:
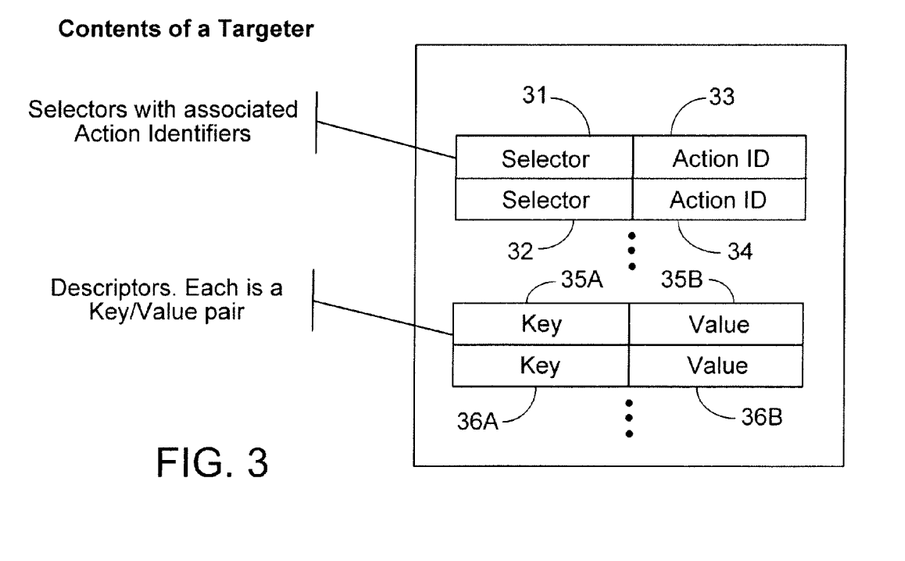
FIG. 3 is a diagrammatic representation of contents of a targeter.

Referring to FIG. 3, there is shown a diagrammatic representation of the contents of targeter 21. There are selectors, such as 31 and 32 associated with action identifiers, such as 33 and 34, respectively. Each descriptor comprises a key value pair such as 35A, 35B and 36A, 36B.

When transmitted, targeters are represented as a potentially short XML (Extensible Markup Language) document following a widely used DTD or XSD (Document Type Definition, XML Schema Definition: declarations that define a document type for the XML language). If XML is not feasible in a given deployment for some reason, any serializeable representation may be used. In a device they may be stored any convenient representation.

A selector is a Boolean expression over the keys and the descriptors in the message and the descriptor stored in the receiving device. The syntactic representation of selectors may be one of many representations with identical semantics that will be apparent to one of ordinary skill in the art.

A naming scheme indicates whether a key appearing in a selector refers to a descriptor in the message or to a descriptor stored in the receiving device. In one possible naming scheme, when a key called "Role" appears in a selector, it may appear as "Message.Role" or as "Receiver.Role."

The Boolean expression may be simple or compound. An example of a simple expression is "Receiver.Role=Commander." An example of a compound expression is "Receiver.Role=Commander AND Receiver.Status!=Emergency." A compound expression uses the standard Boolean connectors AND, OR, and NOT to conjoin other expressions which may be simple or compound.

Simple expressions may use the standard relational operators or any of the set of functions provided by the receiver device. For example there can be a distance function supporting an expression like "Distance (Receiver. Location, Message. Target Location)<5" that targets receivers within five miles of a specified target location.

An action identifier is short code describing a delivery action to be taken when a selector evaluates to True. Example action identifiers are codes commanding:

Display message title (for later selection by user)
Display or play message contents immediately
Execute message (for example the data package may contain a software application)
Deliver message contents to an application (identified by a port number stored in one of the descriptors of the targeter in the message).

In some embodiments one or more preconfigured selectors may be automatically added to the list of selectors evaluated against the descriptors before targeting. An example would be "Receiver.Address=Message.Address" with an appropriate associated action identifier.

Descriptors were shown in FIG. 3 as key-value pairs. In some embodiments the keys are stored explicitly in the descriptors. In other embodiments the keys are not stored explicitly but are implicitly represented based on the position of the descriptors in the data structure. In still other embodiments some keys are implicitly represented and some are stored explicitly. In the following example descriptors, the key strings to be used are not stated and can be chosen to be any appropriate string as long as the key of each descriptor used in a particular system is unique.

The targeter stored in a receiver has zero or more descriptors. The values in some of the descriptors may change over time. Examples of possible descriptors in the targeter stored in a receiver include the following.

An address that uniquely identifies the receiver device among all the devices that may receive the same transmission. The address may be an arbitrary string.
The name of the user to which the receiver is assigned.
The role of the user to which the receiver is assigned (e.g. some code or string meaning "firefighter", "chief, "k-9 officer", and so on.)
The unit to which the user is assigned.
The device type of the receiver.
Arbitrary data values that planners have selected to identify personnel in various ways, for example their agency, the government entity which it reports to ("city", "county", etc.), or certifications ("may enter hazmat zone").
The current location of the receiver (from GPS or other source), represented as longitude and latitude
The current status of the receiver (for example, normal vs emergency mode depending on whether the user has selected emergency mode operation)
Arbitrary data values that applications running on the receiver have stored in the descriptor list, for example what road a vehicle is currently driving on.

The targeter inserted into a transmitted message also has zero or more descriptors. Examples include the following.

A message ID which is a large integer that uniquely identifies the transmission.
Sender identification or address
Urgency
A port number
A cryptographic signature.

An important feature of the invention (to reduce the cost of sending the targeter over the air) is that keys and action IDs may be implicitly understood by the receiver. For example, the first data item in the descriptor may be known to be the Urgency code (Message.Urgency=Emergency would appear in the receiver selector, but the string "Urgency" never appears in the message). Similarly, an action ID may be omitted and the action to be carried out may be understood based on which selector this is, or there may be a default operation such as display to user.

Figure 4:
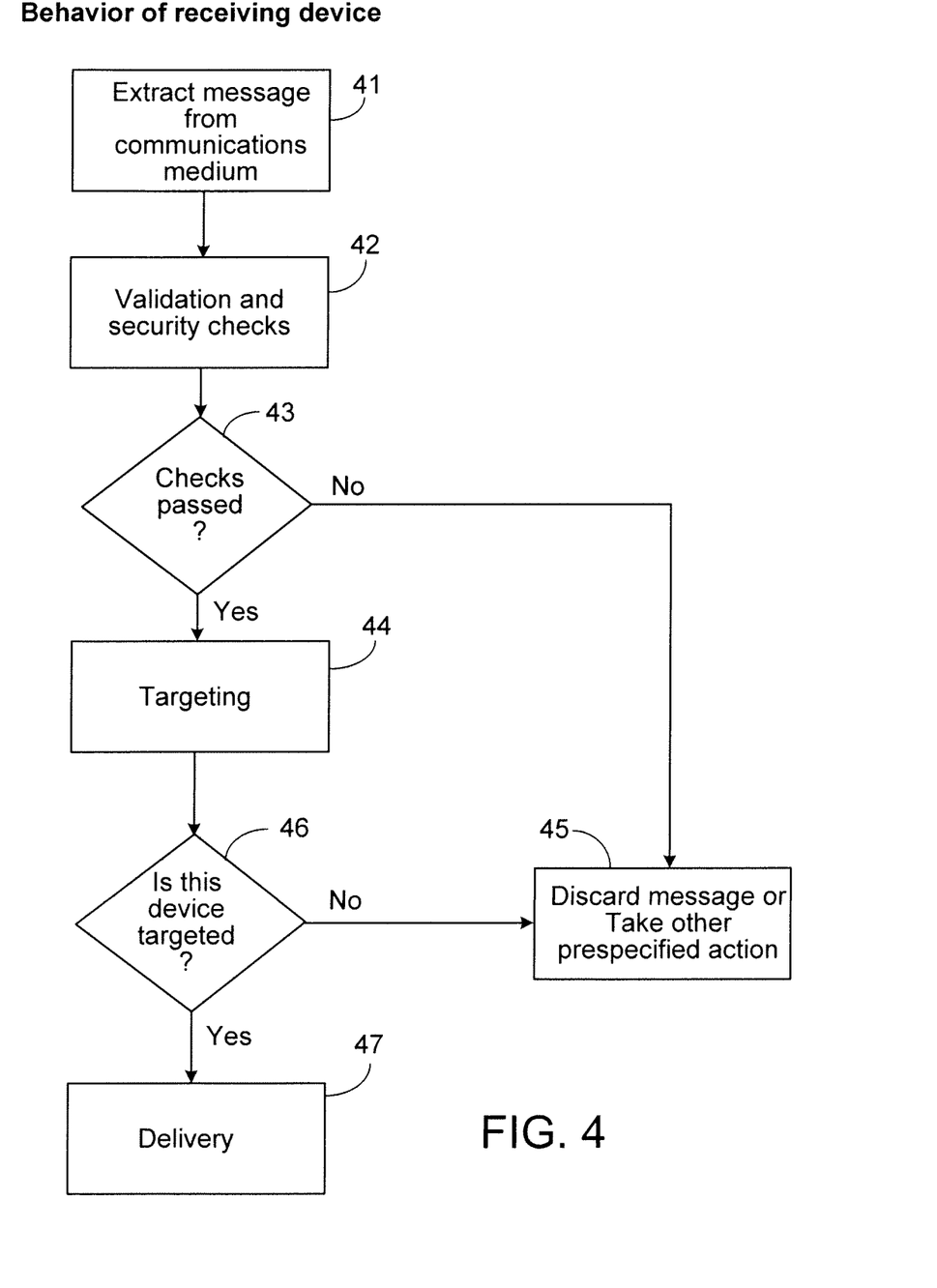
FIG. 4 is a flow diagram of the process in a receiving device according to the invention.

Referring to FIG. 4, there is shown a flow diagram illustrating the behavior of a receiving device. The first step 41 involves extracting the message from the communications medium. The next step 42 involves validation and security checks. The next step 43 involves a decision of whether the checks passed; if yes, proceeding to step 44 of targeting; if no, proceeding to step 45 discard message or take other prespecified action.

The next step after targeting 44 is decision step 46. If the device is targeted, it proceeds to the delivery step 4 7 in which all actions in the action list are carried out. If the device is not targeted, it proceeds to discard message or take other prespecified action 45.

Figure 5:
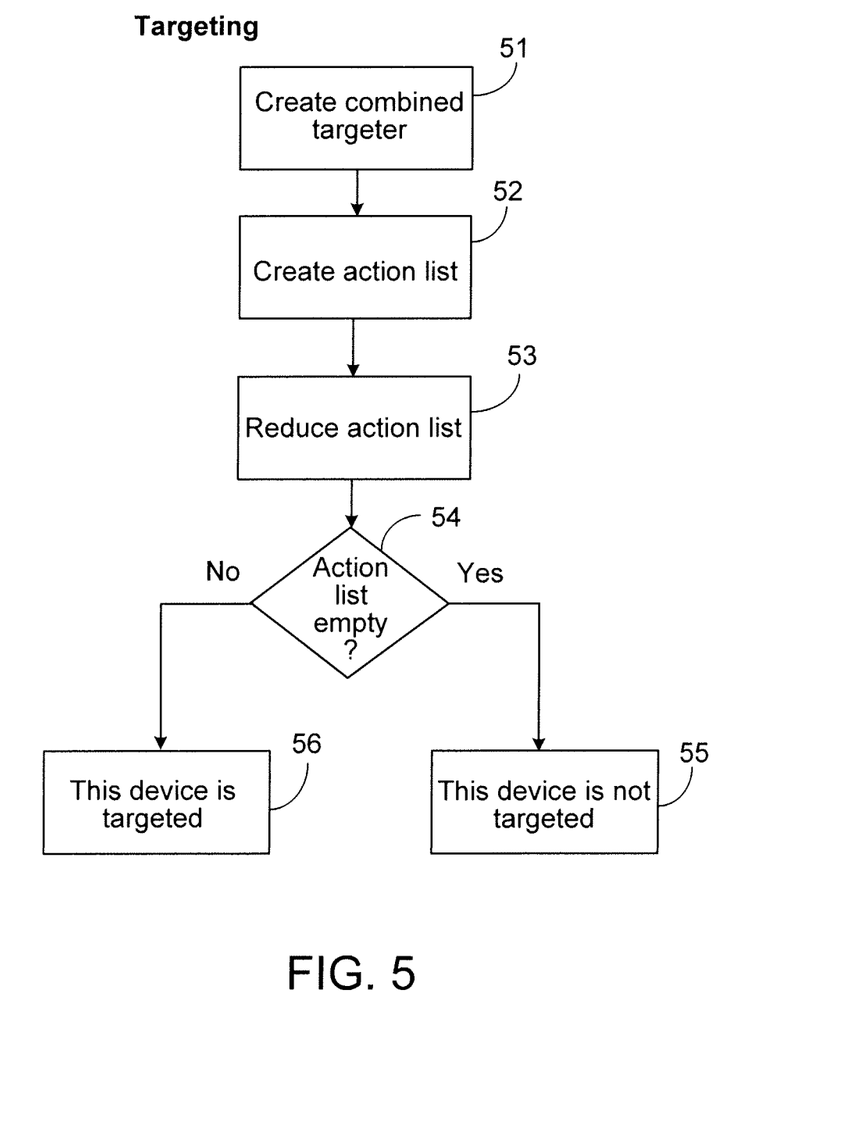
FIG. 5 is a flow diagram of the targeting process according to the invention.

Referring to FIG. 5, there is a flow diagram illustrating the targeting process. The first step 51 involves creating a combined targeter. The next step 52 involves creating an action list. The next step 53 involves reducing the action list. The next step 54 is a decision step; if the action list is empty, proceed to step 55 indicating this device is not targeted. If the action list is not empty, proceed to the next step 56 indicating that this device is targeted.

Figure 6:
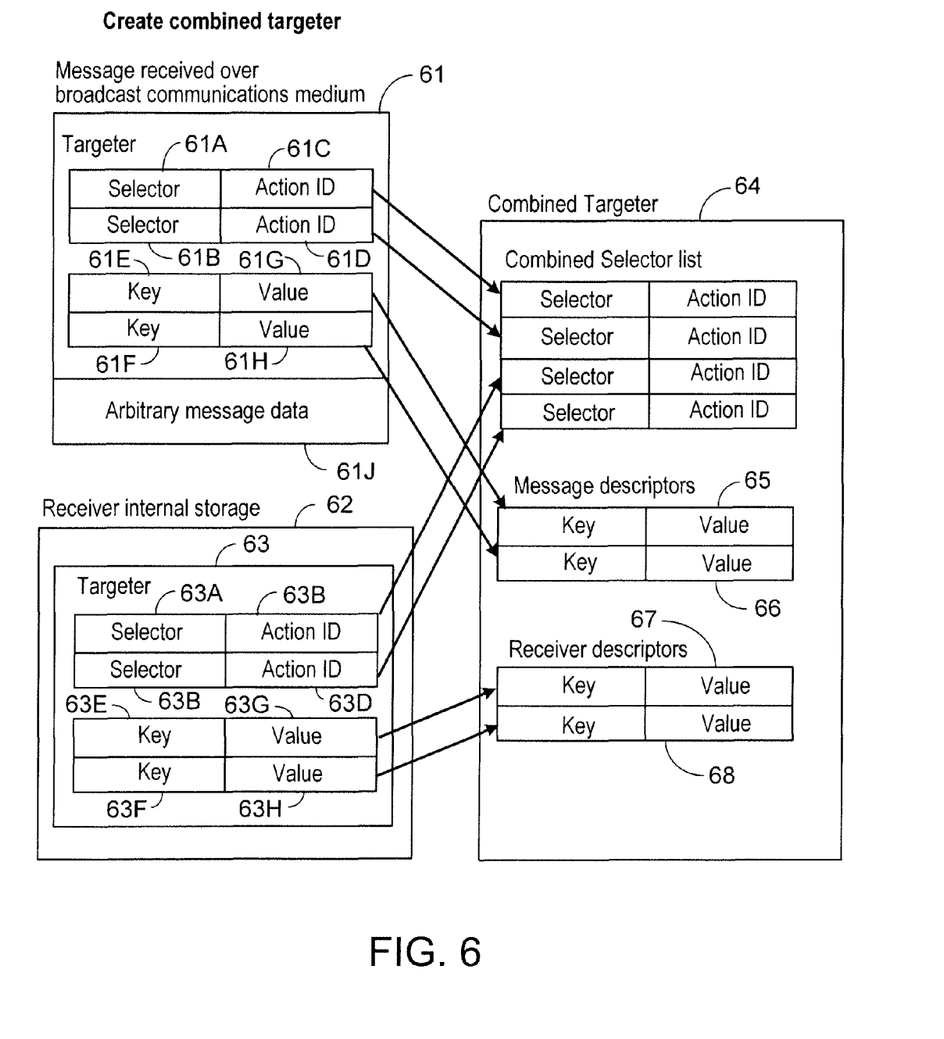
FIG. 6 is a block diagram illustrating the creation of a combined targeter.

Referring to FIG. 6, there is shown a block diagram illustrating the logical arrangement of creating a combined targeter. A message received over the broadcast communications medium 12 contains targeter 61 shown having a pair of selectors 61 A and 61 B associated with action ID's 61 C and 61 D, respectively and keys 61 E and 61 F associated with values 61 G and 61 H, respectively and storing arbitrary message data 61 J.

Receiver internal storage 62 has targeter 63 that is structured like targeter 61 with components identified by 63 with a letter the same as a corresponding component in targeter 61.

Combined targeter 64 is shown with four selectors receiving action ID from the action ID's in targeters 61 and 62 associated with respective action ID's. Combined targeter 64 also has message descriptors 65 and 66 that receive the key value from targeter 61 and receiver descriptors 67 and 68 that receive key values from the receiver internal storage 62.

Figure 7:
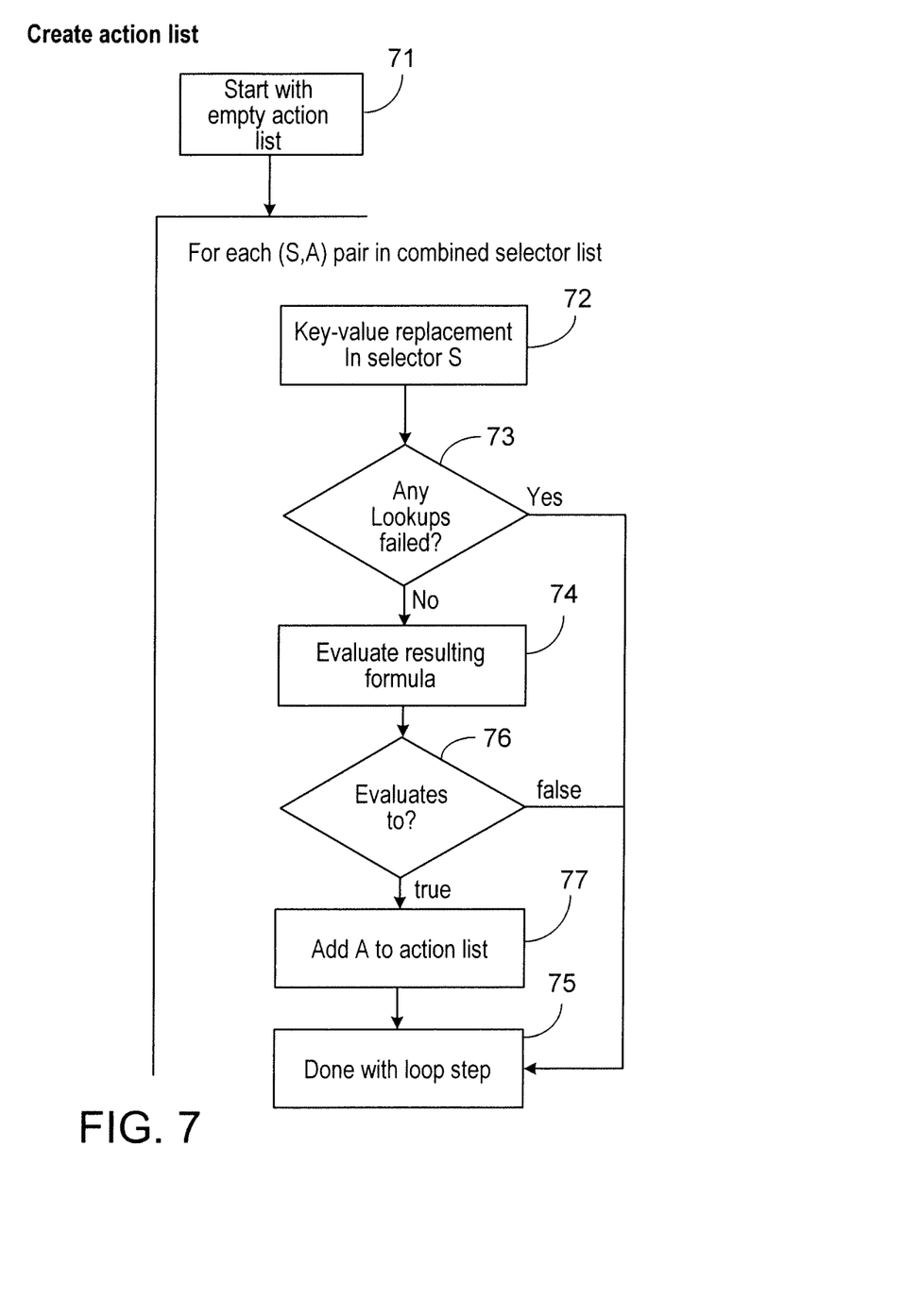
FIG. 7 illustrates the process of creating an action list.

Referring to FIG. 7, there is shown a flow diagram illustrating creation of an action list. The process begins with start with empty action list 71. For each pair of selector and action ID in the combined selector list, represented as (S, A) in the diagram, step 72 involves key-value replacement in selector S, decision step 73 deciding whether any lookups failed and advancing to step 74 if the answer is no to evaluate resulting formula step 74 and to done with loop step 75 if the answer is yes. Following evaluate resulting formula step 74 the next decision step 76 evaluates to: if false goes to done with loop step 75 and if true goes to add A to action list 77 followed by going to done with loop step 75.

Figure 8:
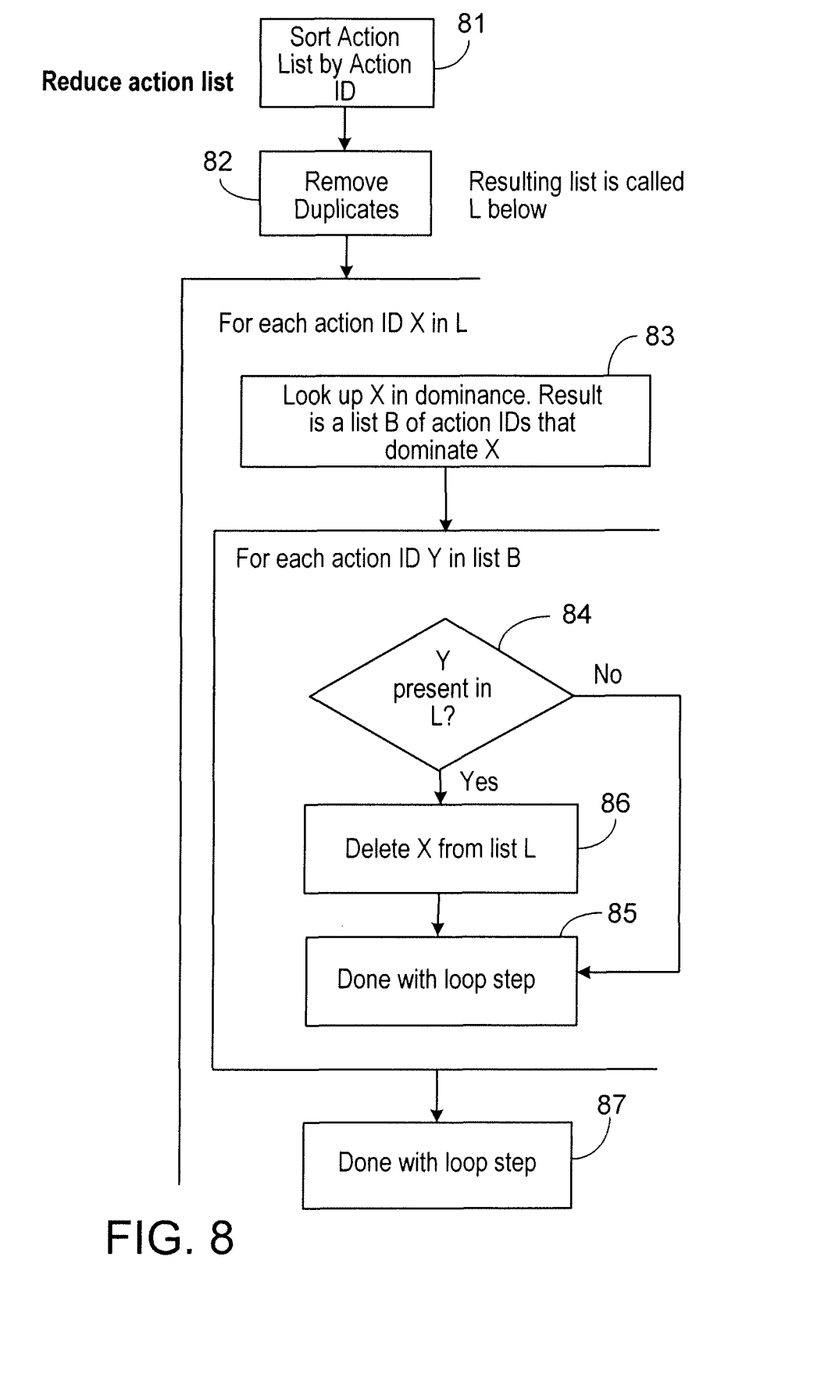
FIG. 8 illustrates the process of reducing the reaction list.

Referring to FIG. 8, there is shown a flow chart illustrating reducing the action list. The first step is to sort action list by action ID 81, then remove duplicates step 82 with the resulting list being called L below. Looping over each action ID in L, called X in the following, the next step 83 involves looking up X in a preconfigured dominance table with the result is list B of action IDs that dominate X. There follows for each action ID Y in list B advancing to a decision step 84 if Y not present in L proceeding to done with loop step 85 and if yes, proceed to delete X from list L step 86 followed by done with loop step 85. This ends the loop over each action ID in list B, the next step is done with loop step 87 for the loop over each action ID in list L.

An example of push/pull targeting follows. A citizen sends a message to the 911 center reporting a fire at 4th and main streets. The message has an attached picture of the fire. (Support for multimedia attachments is a key attribute of next-generation 911 systems).

When the 911 center dispatches firefighters to the scene, it additionally broadcasts the picture of the fire provided by the citizen, using the targeting method to assure the picture reaches the right units in the field. In range of the broadcast there may be dozens or hundreds of public safety officers, many of whom should not be interrupted from their jobs by this picture because it is not relevant to them.

The targeter in the message includes the following information. Some of this information would be represented by numeric codes and some of the key names would be omitted as described elsewhere, to shorten the message length. Hypothesize that LAT and LONG are the numerical latitude and longitude of the intersection of 4th and main street.

| Descriptors | |
| --- | --- |
| Contents | JPEG Picture |
| Incident status | Emergency |
| Incident type | Fire |
| Selectors | Actions |
| Receiver.Agency = FireDepartment AND Distance(Receiver.Location, LAT, LONG) < 5 | Display |
| Receiver.Agency = FireDepartment AND Distance(Receiver.Location, LAT, LONG) > = S | Store in local storage |

Receivers installed in fire trucks and other fire department vehicles contain targeters with the following information (among other descriptors and selectors).

| Descriptors | |
| --- | --- |
| Agency | Fire Department |
| Location | CURRENTLAT, CURRENTLONG |

When the message containing the first targeter arrives at a receiver in a fire department vehicle containing the second targeter, one of the two selectors in the message's targeter will evaluate to true. Thus depending on the location of the fire vehicle, either the image will be automatically displayed (if the vehicle is within 5 miles of the fire) or it will be stored allowing the user to view it if desired by selecting from a local menu.

The power of the targeting system becomes apparent in considering another receiver, this one assigned to a police officer whose job is to provide support for the fire department's needs. This police officer's receiver is configured with a targeter that includes the following descriptors and selectors, among others.

| Descriptors | |
| --- | --- |
| Agency | Police Department |
| Location | CURRENTLAT, CURRENTLONG |
| Selectors | Actions |
| Message, Incident type = Fire | Display |

When a message containing the first targeter arrives at the police vehicle containing the third targeter, the selector in the receiver evaluates to true. Thus the image of the fire will be automatically displayed to the police officer, even though the targeter in the message did not explicitly mention the need to deliver the message to that officer. What this shows is both push and pull operating at the same time: the message is pushed to the fire vehicles, and pulled by the police vehicle.

The combination of push and pull targeting in a single system enables a range of flexible operational behaviors, so the system can be easily customized to deliver the right information to the right people with minimal repetition of messages.

There has been described novel apparatus and techniques for flexibly targeting information sent over a broadcast communications medium. It is evident that those skilled in the art may now make numerous uses in modifications of and departures from the specific apparatus and techniques disclosed herein without departing from the inventive concepts. Consequently the invention is to be construed as embracing each and every novel feature and novel combination of features present in or possessed by the apparatus and techniques herein disclosed.

What is claimed is:
1. A method for flexibly targeting information sent over a broadcast communications medium comprising:
 (a) extracting by a receiver device a message from the broadcast communications medium, the message comprising a first targeter,
  wherein the receiver device comprises a second targeter,
  wherein each targeter comprises one or more selectors associated with an action ID and one or more key value pairs;

(b) determining whether one or more conditions for a given selector are met for one or more values of the key value pairs; and (c) in response to determining that the one or more conditions for the given selector are met, performing an action identified by the action ID associated with the given selector.

2. The method of claim 1, wherein the determining (b) and the performing (c) comprise:

(b1) using one or more values of the key value pairs of the second targeter, determining whether one or more conditions of a given selector of the first targeter are met; and (c1) in response to determining that the one or more conditions of the given selector of the first targeter are met, performing an action for the action ID associated with the given selector of the first targeter.

3. The method of claim 1, wherein the determining (b) and the performing (c) comprise:

(b1) using one or more values of the key value pairs of the first targeter, determining whether one or more conditions of a given selector of the second targeter are met; and (c1) in response to determining that the one or more conditions of the given selector of the second targeter are met, performing an action for the action ID associated with the given selector of the second targeter.

4. The method of claim 1, wherein the one or more selectors comprise one or more Boolean expressions.

5. The method of claim 1, wherein the action IDs associated with one or more of the selectors and the keys for one or more of the key value pairs are omitted as being understood by the receiver device according to a prearranged system.

6. The method of claim 1, wherein the determining (b) comprises:

(b1) creating a combined targeter comprising the selectors and the associated action IDs and key value pairs from the first and second targeters, wherein the selectors in the combined targeter comprise the given selector;

(b2) determining whether one or more conditions for the given selector are met for any key value pair in the combined targeter; and (b3) in response to determining that the one or more conditions for the given selector are met for a given key value pair, adding the action ID associated with the given selector to an action list.

7. The method of claim 6, wherein the performing (c) comprises:

(c1) performing at least one action identified by at least one action ID on the action list.

8. A method for flexibly targeting information sent over a broadcast communications medium comprising:

(a) extracting by a receiver device a message from the broadcast communications medium, the message comprising a first targeter, wherein the receiver device comprises a second targeter, wherein each targeter comprises one or more selectors, wherein one or more action IDs and keys for one or more of key value pairs associated with the one or more of the selectors are omitted from the message as being understood by the receiver device according to a prearranged system;

(b) determining whether one or more conditions for a given selector are met for one or more values of the associated one or more key value pairs as understood by the receiver device; and (c) in response to determining that the one or more conditions for the given selector are met, performing an action identified by the action ID associated with the given selector as understood by the receiver device.

9. A system, comprising:

one or more receiver devices constructed and arranged to extract a message from a broadcast communications medium, the message comprising a first targeter, wherein at least one of the receiver devices comprises a second targeter, wherein each targeter comprises one or more selectors associated with an action ID and one or more key value pairs, wherein the at least one receiver device is constructed and arranged to determine whether one or more conditions for a given selector are met for one or more values of the key value pairs, and to perform an action identified by the action ID associated with the given selector in response to determining that the one or more conditions for the given selector are met.

10. The system of claim 9, wherein the at least one receiver device is further constructed and arranged to:

using one or more values of the key value pairs of the second targeter, determine whether one or more conditions of a given selector of the first targeter are met; and in response to determining that the one or more conditions of the given selector of the first targeter are met, perform an action for the action ID associated with the given selector of the first targeter.

11. The system of claim 9, wherein the at least one receiver device is further constructed and arranged to:

using one or more values of the key value pairs of the first targeter, determine whether one or more conditions of a given selector of the second targeter are met; and in response to determining that the one or more conditions of the given selector of the second targeter are met, perform an action for the action ID associated with the given selector of the second targeter.

12. The system of claim 9, wherein the one or more selectors comprise one or more Boolean expressions.

13. The system of claim 9, wherein the action IDs associated with one or more of the selectors and the keys for one or more of the key value pairs are omitted from the message as being understood by the receiver device according to a prearranged system.

14. The system of claim 9, wherein the at least one receiver device is further constructed and arranged to:

create a combined targeter comprising the selectors and the associated action IDs and key value pairs from the first and second targeters, wherein the selectors in the combined targeter comprise the given selector;

determine whether one or more conditions for the given selector are met for any key value pair in the combined targeter; and in response to determining that the one or more conditions for the given selector are met for a given key value pair, add the action ID associated with the given selector to an action list.

15. The system of claim 14, wherein the at least one receiver device is further constructed and arranged to:

perform at least one action identified by at least one action ID on the action list.

16. A system, comprising:

one or more receiver devices constructed and arranged to extra a message from a broadcast communications medium, the message comprising a first targeter, wherein at least one of the receiver devices comprises a second targeter, wherein each targeter comprises one or more selectors, wherein one or more action IDs and keys for one or more of the key value pairs associated with one or more of the selectors are omitted from the message as being understood by the at least one receiver device according to a prearranged system, wherein the at least one receiver device is constructed and arranged to determine whether one or more conditions for a given selector are met for one or more values of each key value pair as understood by the at least one receiver device, and to perform an action identified by the action ID associated with the given selector as understood by the at least one receiver device, in response to determining that the one or more conditions for the given selector are met.

* * * * *